United States Patent [19]

Negishi et al.

[11] Patent Number: 4,885,574
[45] Date of Patent: Dec. 5, 1989

[54] DISPLAY AND KEYBOARD PANEL

[75] Inventors: Hidetaka Negishi, Machida; Shigemitsu Aoki, Tokyo, both of Japan

[73] Assignee: Texas Instruments Incorporated, Dallas, Tex.

[21] Appl. No.: 326,424

[22] Filed: Mar. 22, 1989

Related U.S. Application Data

[63] Continuation of Ser. No. 872,565, Jun. 10, 1986, abandoned.

[30] Foreign Application Priority Data

Jun. 19, 1985 [JP] Japan ................. 60-135085

[51] Int. Cl.$^4$ .............................. H01H 9/16
[52] U.S. Cl. ..................... 340/711; 341/22; 341/23; 341/34
[58] Field of Search ......... 340/711, 712, 784; 341/22, 23, 24, 25, 26, 32, 33, 34; 235/61 R, 145 R; 369/706, 709

[56] References Cited

U.S. PATENT DOCUMENTS

| | | | |
|---|---|---|---|
| 3,967,273 | 6/1976 | Knowlton | 340/365 S |
| 4,078,257 | 3/1978 | Bagley | 340/365 VL |
| 4,124,843 | 11/1978 | Bramson et al. | 340/365 VL |
| 4,333,097 | 6/1982 | Buric et al. | 340/365 VL |
| 4,398,086 | 8/1983 | Smith, III | 340/365 VL |
| 4,524,414 | 6/1985 | Kiyokawa | 340/712 |
| 4,529,968 | 7/1985 | Hilsum et al. | 340/365 C |
| 4,547,860 | 10/1985 | Lapeyre | 364/709 |
| 4,566,001 | 1/1986 | Moore et al. | 340/365 VL |
| 4,595,804 | 6/1986 | MacConnell | 340/365 VL |
| 4,633,227 | 12/1986 | Menn | 340/365 VL |

FOREIGN PATENT DOCUMENTS 0072017 4/1985 Japan .................. 340/365 VL
2119994 11/1983 United Kingdom ........ 340/784

OTHER PUBLICATIONS

Hamilton et al—"Memory Arrangement Representing a Keyboard Having Both Fixed and Variable Characters"—IBM Technical Disclosure Bulletin—vol. 21, No. 9—Feb/79—pp. 3471-3472.
"Programmable Keyboard Labelling"—IBM Technical Disclosure Bulletin—vol. 27, No. 11, Apr./1985—pp. 6604-6605.
R. D. Mathews—"Dual-Keyboard Graphics"—IBM Technical Disclosure Bulletin—vol. 19, No. 2, Jul./19-79—p. 375.
Bigbie et al.—"Programamble Key/Display/Switch Device"—IBM Technical Disclosure Bulletin—vol. 21, No. 2, Jul./1978—pp. 442-444.

Primary Examiner—David K. Moore
Assistant Examiner—M. Fatahiyar
Attorney, Agent, or Firm—William E. Hiller; N. Rhys Merrett; Melvin Sharp

[57] ABSTRACT

A display and keyboard panel for an electronic device such as a handheld or desktop calculator, the panel having a keyboard area and an indication area located in the vicinity of the keyboard area. The indication area has a plurality of key sections each having at least two component areas each for indicating a single piece of information. Each of the key sections is typically formed by a touch sensor switch area having at least two adjacent areas corresponding respectively to the aforesaid component areas, each of the adjacent areas of the touch sensor switch area including at least one segment or plural segments of a conductor.

7 Claims, 7 Drawing Sheets

DISPLAY AND KEYBOARD PANEL

This is a continuation of Ser. No. 872,565, filed 6/10/86, now abandoned.

FIELD OF THE INVENTION

The present invention relates to display and keyboard panels for electronic devices and systems such as, for example, calculators of the handheld or desktop type, telephone sets of the multi-function type, schedulers, personal computers, word processors and so on.

BACKGROUND OF THE INVENTION

A known display and keyboard panel for an electronic device such as a handheld or desktop calculator has keyboard and function indicator areas arranged in the vicinity of each other to enable the operator of the device to enter information at the key sections of the keyboard area while viewing the indications appearing in the key sections of the function indication area. This provides ease of use and a minimum chance of error in keying information and thus offers an efficient man-machine interface between the operator and the calculator.

The key sections of the keyboard and function indicator areas are respectively formed by the touch sensor switch areas patterned by discrete segment electrodes provided in a liquid crystal structure which forms part of the display and keyboard panel. In the liquid crystal structure used as the display device, the touch sensor switch areas may be used for the display of images not only on the key sections of the keyboard area but on the key sections of the function indication area. Each of the key sections of the function indication area in a conventional display and keyboard panel of the described type has assigned thereto only one set of information such as, for example, only one mode of operation. This means that there must be provided as many key sections in the function indication area and as many touch sensor switch areas in the liquid crystal structure as the modes of operation available in the electronic device, thus requiring a disproportionately large space for the function indication area and limiting the number of the modes of function which can be displayed.

The liquid crystal device for use in such a display and keyboard panel may be replaced with a device using the matrix-array electrode arrangement in lieu of the segment electrode structure. The use of such a matrix-array liquid crystal device however requires the provision a far larger number of terminals for connection to the drive system for the function indication area than in a display and keyboard panel using the segment electrode liquid crystal structure and accordingly the use of a large-scale integrated circuit of a relatively large capacity for the drive system.

It is, accordingly, an important object of the present invention to provide an improved display and keyboard panel which will provide ease of use and a minimum chance of error in keying information.

It is another important object of the present invention to provide an improved display and keyboard panel which will offer an efficient man-machine interface between the operator and the device.

Yet, it is another important object of the present invention to provide an improved display and keyboard panel which has a minimized space required for the function indication area to allow display of an increased number of modes of function through a liquid crystal device with use of a large-scale integrated circuit of a relatively small capacity for the drive system of the liquid crystal device.

SUMMARY OF THE INVENTION

In accordance with the present invention, there is provided a display and keyboard panel having a keyboard area and an indication area located in the vicinity of the keyboard area, characterized in that the indication area comprises by a plurality of key sections each having at least two component areas each for indication of a single piece of information. Each of the key sections is typically formed by a touch sensor switch area having at least two adjacent areas corresponding respectively to the aforesaid component areas, each of the adjacent areas of the touch sensor switch area including at least one segment or plural segments of a conductor. The plural segments of the conductor are preferably connected to a single common conductor line. A display and keyboard panel according to the present invention may further comprise selector means for selecting one of the key sections and one of the component areas of each of the selected key sections for the display of the piece of information assigned to the selected component area of each of the selected key sections.

BRIEF DESCRIPTION OF THE DRAWINGS

The features and advantages of a display and keyboard panel according to the present invention will be more clearly appreciated from the following description taken in conjunction with the accompanying drawings in which like reference numerals designate similar or corresponding units, members and elements and in which:

FIGS. 5 to 11 are plan views of the display and keyboard panel embodying the present invention under various conditions of the calculator, wherein

DESCRIPTION OF THE PREFERRED EMBODIMENTS

A display and keyboard panel according to the present invention will be hereinafter described with reference to the drawings, first to FIG. 1, wherein the display and keyboard panel is embodied in a handheld or desktop type electronic calculator (hereinafter referred to simply as calculator) by way of example. It should however be borne in mind that a display and keyboard panel according to the present invention will find practical applications in a wide variety of electronic devices requiring display and key-in capabilities.

The display and keyboard panel embodying the present invention, designated in its entirety by reference numeral 20, largely comprises a laterally elongated information display area 22, a keyboard area 24 and a function indication area 26 in addition to a power supply or ON/OFF switch 28 and a mode selector switch 30. The information display area 22 is used in part for the display of a numerical value such as of the result of computation and in part for the display of a selected mode of function. Thus, the information display area 22 comprises a plurality of numeral display sections 32 each including a generally 8-shaped seven-segment numerical pattern and additionally a function mode display section 34 consisting of a plurality of row areas each indicating a predetermined mode of function operable in the calculator. In the arrangement of the display and keyboard panel herein shown, the function mode display section 34 is by way of example assumed to consist of total of five areas for the indication of the program learning mode "LRN", unit conversion mode "CONV", scientific computation mode "S/F", statistic computation mode "STAT", and programmable run/-stop mode "R/S", respectively, as in an ordinary calculator.

The keyboard area 24 of the display and keyboard panel 20 consists of a number of key sections which are largely broken down to two major categories, viz., a set of arithmetic key sections 36 including numerical and sign key sections, and a set of instruction key sections 38 representative of various operating instructions. In FIG. 1, the arithmetic key sections 36 are arranged in rows and columns and are shown enclosed within solid lines and the instruction key sections 38 shown enclosed by broken lines. The instruction key sections 38 are also arranged in rows and columns and include key sections each of which has two row areas respectively assigned to different operating instructions. For example, the instruction key section 38 bearing the indicia "COS" an "In-cm" has two areas respectively assigned to the operation for the computation of cosine values and the operation for the conversion of units between inch and centimeter. As will be understood as the description proceeds, one of the indicia borne in these two row areas of each of such key sections 38 is put into display when the mode selector switch 30 is depressed.

On the other hand, the function indication area 26 comprises a plurality of key sections 40 which are arranged in a single row by way of example and which are shown enclosed by dot-and-dash lines with the individual display sections shown separated by dots. In the embodiment of a display and keyboard panel according to the present invention as herein shown, each of these key sections 40 of the function indication area 26 has two or three row areas assigned to different functions which can be performed by the calculator. For example, one of the key sections 40 of the function indication area 26, viz., the key section bearing the indicia "GTO", "MC" and "DRG" has three row areas which are assigned to the program learning mode "GTO", basic calculation mode "MC", and function computation mode "DRG", respectively. Similarly to the instruction key sections 38 having two row areas, one of the indications in these two or three row areas of each function indicator key section 40 is put into display with the mode selector switch 30 depressed. The function computation mode "DRG" represented by one row area of the function indicator key section 40 "GTO/MC/DRG" corresponds to the scientific computation mode "S/F" to be indicated in the display section 34 of the information display area 22.

Figure 1:
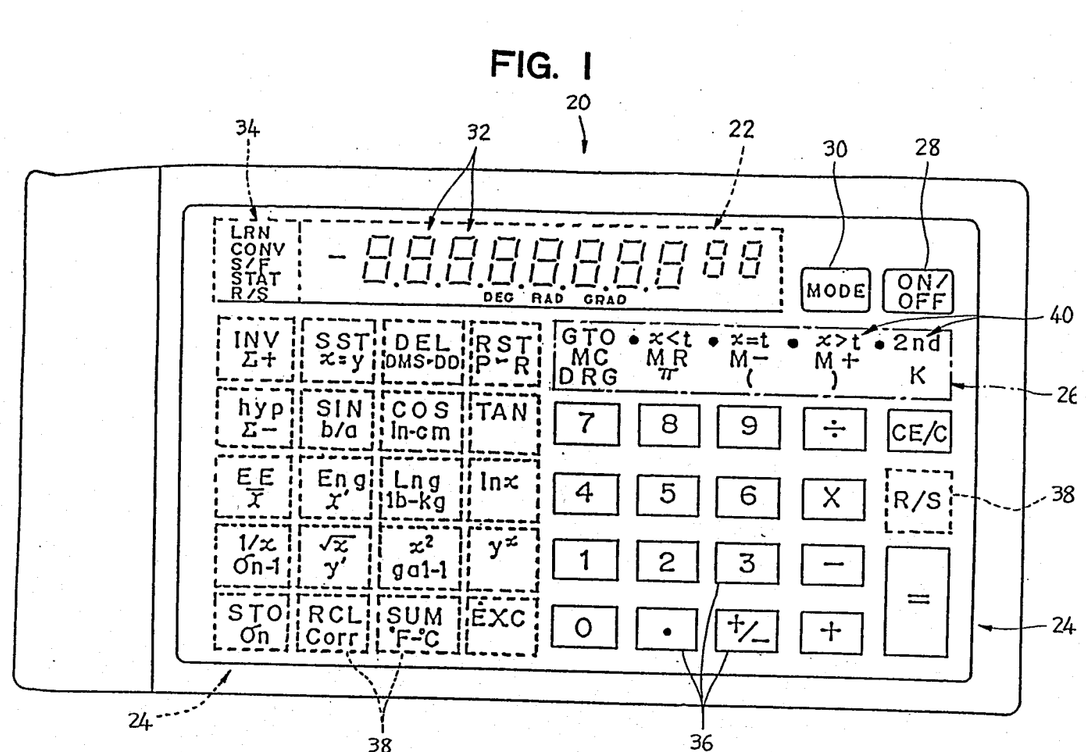
FIG. 1 is a plan view showing a first preferred embodiment of a display and keyboard panel according to the present invention, the display and keyboard panel being of a handheld or desktop calculator with the shown indicia selectively put into display.

The indicia shown in FIG. 1 include various abbreviations, acronyms, mnemonic codes, signs and symbols representative of different operating instructions and potential capabilities of the calculator. These indicia are to appear on the panel 20 only selectively depending upon the selected modes of function as will also be understood as the description proceeds and would not be on display all at a time. In actuality, some of the instruction key sections 38 and some of the function indicator key sections 40 are selected for display and, in addition, only one of the indicia included in each of the key sections 38 and 40 is put into display for each of the modes of function selected at the mode selector switch 30. The natures of the instructions and capabilities represented by the indicia herein shown are rather immaterial to the understanding of the gist of the present invention and may be selected as desired depending on the purposes for which the calculator is to be used. No detailed description will be made for these reasons herein regarding the specific natures of such instructions and capabilities.

Figure 2:
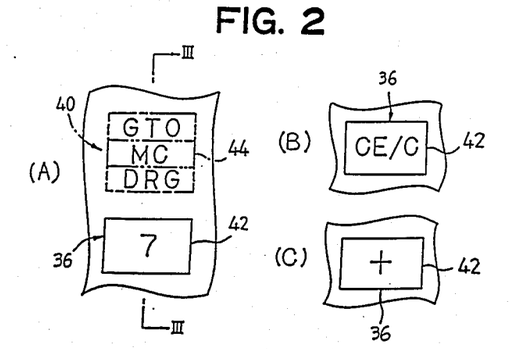
FIG. 2 is a view showing, in sections (A), (B) and (C), the arrangements of the touch sensor switch areas forming some of the arithmetic and function indicator key sections provided in the display and keyboard panel shown in FIG. 1.

The arithmetic and instruction key sections 36 and 38 are respectively formed by touch sensor switch areas 42 and, likewise, the function indicator key sections 40 are respectively formed by touch sensor switch areas 44, as schematically indicated in sections (A), (B) and (C) of FIG. 2. In FIG. 2, the arithmetic key sections 36 are represented by the numerical key section "7" (FIG. 2A), clear-enter/clear-all key section "CE/C" (FIG. 2B) and sign key section "+" (FIG. 2B), while the key sections 40 of the function indication area 26 are represented by the above mentioned key section "GTO/MC/DRG" (FIG. 2A).

Figure 3:
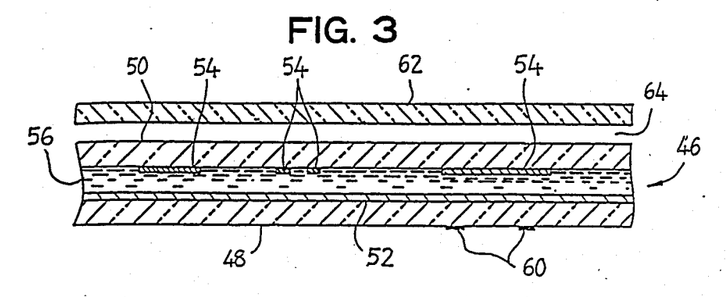
FIG. 3 is a fragmentary cross sectional view showing part of a liquid crystal structure which forms part of the display and keyboard panel embodying the present invention.
Figure 4:
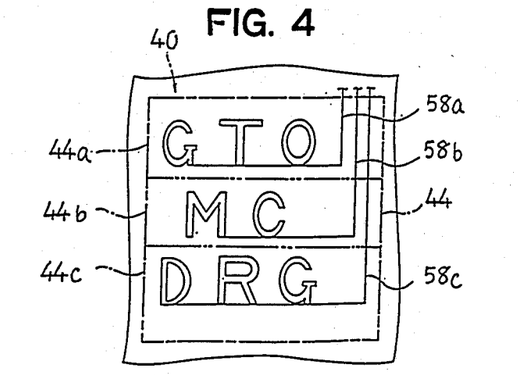
FIG. 4 is a view showing, to an enlarged scale, the arrangement of the segment electrodes forming one of the function indicator key sections provided in the display and keyboard panel shown in FIG. 1.

Each of the indicia in the individual key sections 36, 38 and 40 thus formed by the touch sensor switch areas 42 and 44 are provided by patterned electrode regions in a liquid crystal structure which may be constructed as shown in FIG. 3 of the drawings. The liquid crystal structure, generally designated by reference numeral 46, is per se well known in the art, and comprises two, lower and upper substrates 48 and 50 of transparent glass which are spaced apart in parallel from each other to form a gap therebetween. The lower glass substrate 48 has attached to its inner face a transparent conductive film 52 which is substantially coextensive with the substrate 48 to provide a common electrode of the liquid crystal structure 46. The upper glass substrate 50 has attached to its inner face a patterned conductive film 54 to provide segment electrodes of the liquid crystal structure 46. The conductive film 54 on the substrate 50 is patterned to have discrete regions respectively to provide the segment electrodes for the display of the various indicia in the arithmetic and function indicator key sections 36 and 40 as depicted in FIG. 4 in respect of, for example, the three-row function indicator key section 40 "GTO/MC/DRG". Though not shown in the drawings, the patterned conductive film 54 on the upper substrate 50 further has separate regions to provide segment electrodes for the display of the seven-segment numerical indicia in the display sections 32 and the indicia in the function mode display section 34 of the information display area 22 illustrated in FIG. 1. In the gap between the lower and upper substrates 48 and 50 thus coated with the conductive films 52 and 54, respectively, is filled liquid crystal as indicated at 56 as is customary in the art.

The electrode regions 54 providing the indicia in each of the row areas of each of the instruction key sections 38 and function indicator key sections 40 are connected by a common conductive line to the control circuit (not shown) incorporated in the calculator. In the case of, for example, the touch sensor switch area 44 forming the function indicator key section 40 "GTO/MC/DRG", the switch area 44 has three row areas 44a, 44b and 44c assigned to the program learning mode "GTO", basic calculation mode "MC", and function computation mode "DRG", respectively, as shown in FIG. 4. The respective sets of segment electrodes 54 provided in association with these three row areas 44a, 44b and 44c are connected by conductive lines 58a, 58b and 58c, respectively, to the control circuit of the calculator so that the segment electrodes 54 in only one or two of these row areas 44a, 44b and 44c are to be energized during operation in a selected mode of function.

On or over the outer face of the upper segment electrode substrate 50 of the liquid crystal structure 46 is provided a transparent, pliable sensor web 62 which forms the top layer of the display and keyboard panel 20 shown in FIG. 1. This pliable sensor web 62 forms part of sensor mean which further comprises a plurality of touch sensor elements of, for example, the capacitance type, though not shown in the drawings. These sensor switch elements are located respectively in registry with the arithmetic key sections 36, instruction key sections 38 and function indicator key sections 40 of the keyboard area 22 shown in FIG. 1. Each of these touch sensor elements, which per se are well known in the art, is operative to produce a signal by a change in the quantity of charges as induced when the sensor web 62 is depressed by a finger pressure over its area registering with the particular sensor element. The sensor web 62 may be attached directly to the upper face of the upper segment electrode substrate 50 but is, as shown, preferably spaced apart in parallel slightly from the substrate 50 to form a gap therebetween as indicated at 64 in FIG. 3. With the small gap 64 thus formed between the substrate 50 and the sensor web 62, the substrate 50 can be kept from direct application of a pressure directly from the sensor web 62 depressed toward the substrate 50. The power ON/OFF switch 28 and the mode selector switch 30 (FIG. 1) may be formed similarly to the key sections of the keyboard area 24 of the panel 20 or may be provided in the form of pushbuttons.

When, now, the mode selector switch 30 (FIG. 1) is depressed with the power ON/OFF switch 28 turned on, the segment electrodes 54 (FIG. 3) in one of the row areas of each of the touch sensor switch areas 44 forming the key sections 40 of the function indication area 26 are selected by the control circuit incorporated in the calculator. In the touch sensor switch area 44 forming, for example, the function indicator key section 40 "GTO/MC/DRG" shown in section (A) of FIG. 2, the segment electrodes in one of the three row areas 44a, 44b and 44c respectively assigned to the modes "GTO", "MC" and "DRG" are thus energized from a power source (not shown) through the associated one of the conductive lines 58a, 58b and 58c, respectively. In the liquid crystal structure 46 shown in FIG. 3, the segment electrodes 54 in the row areas 44a, 44b or 44c thus energized are capacitively coupled with the common electrode 52 across the layer of liquid crystal 56 and produce the images of, for example, the indicia "GTO" representative of the program learning mode. If the mode selector switch 30 is depressed for a second time, the segment electrodes 54 in another row area of each of the touch sensor switch areas 44 are selected so that, in the touch sensor switch area 44 forming key section 40 "GTO/MC/DRG", the segment electrodes in another row area are energized. The segment electrodes 54 in, for example, the row area 44b are thus capacitively coupled with the common electrode 52 and produce the images of the indicia "MC" representative of the basic calculation mode. The operator of the calculator is in this fashion allowed to enter information at the arithmetic key sections 36 of the keyboard area 22 while viewing or glancing at the indications appearing in the key sections 40 of the function indication area 26 which is located close to the arithmetic key sections 36. The calculator thus provides ease of use and a minimum chance of error in keying information into the calculator, offering an efficient man-machine interface between the operator and the calculator.

Because, in addition, of the fact that each of the touch sensor switch areas 44 forming the individual key sections 40 of the function indication area 26 consists of a plurality of component areas respectively assigned to different modes of function, a significantly increased number of modes of operation can be displayed on the panel 20 or a significantly reduced total area suffices for the provision of the function indication area 26 on the panel 20. In the liquid crystal structure 46, furthermore, all the segment electrodes in each of the component areas 44a, 44b or 44c (section (A) of FIG. 2) of each touch sensor switch area 44 are connected to the power source through a common conductive line so that the drive system for the function indication area 26 is significantly simple in construction as compared to a drive system for a liquid crystal structure using the matrix-array display electrode arrangement. It may be noted that the number of the conductor terminals used for the liquid crystal structure 46 is reduced to approximately one to several or even one to tens as compared with ordinary liquid crystal structures using the matrix-array display electrode arrangements as in existing handheld or desktop calculators.

If desired, the electrode regions for the display of the indicia in the arithmetic key sections 36 in particular may be replaced with a patterned film of a colored material printed on, for example, the outer face of the lower common electrode substrate 48 as indicated at 60 in FIG. 3 in view of the fact that each of these key sections 36 has only one numeral or sign assigned thereto. Such a printed colored film 60 may be provided in addition to the segment electrodes for the arithmetic key sections 36 for the purpose of providing ease of visual access to the locations of the touch sensor switch areas 42 forming the key sections 36 when the calculator is in a turned-off state. Furthermore, the control circuit for the liquid crystal structure 46 may be arranged so that the indicia in the individual key sections 40 of the function indication area 26 are to flicker and provide prompting capabilities when the particular key sections are selected for display. In this instance, the control circuit may further be arranged so that the indicia in some of the arithmetic key sections 36 are to flicker when the particular key sections 36 are depressed. The key sections 36 having such flicker capabilities may include the clear-enter/clear-all key section "CE/C" which is to flicker to indicate that the clear-enter mode is currently in play and the plus key section "+" which is to flicker to indicate that the addition operation mode is currently effective.

FIGS. 5 to 11 show the display and keyboard panel 22 under various conditions of the calculator.

Figure 5:
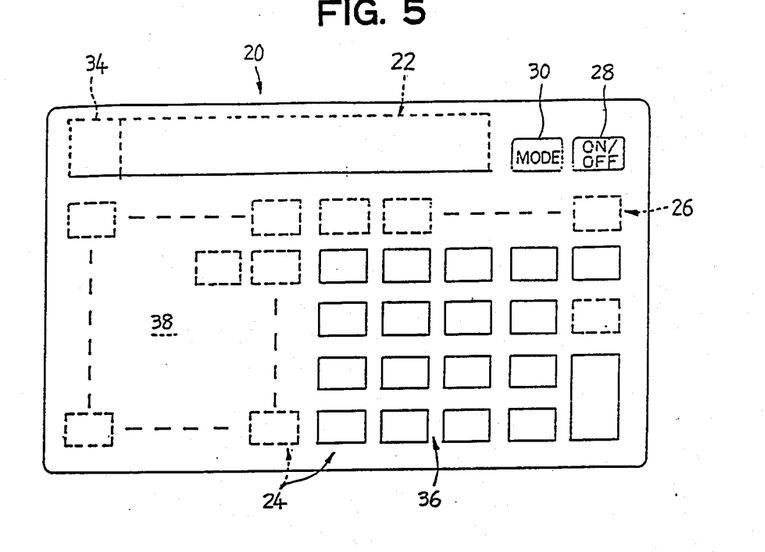
FIG. 5 shows the display produced of the panel when the calculator is in a turned-off condition.
Figure 6:
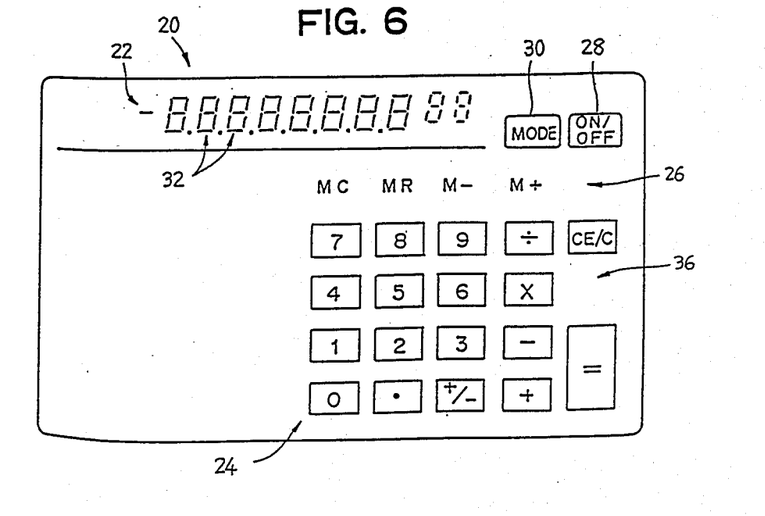
FIG. 6 shows the display of the panel produced with a basic calculation mode ("MC") selected.

When the calculator is in a turned-off condition with the power ON/OFF switch 28 held in the "OFF" position, none of the display sections of the information display area 22 and the key sections of the keyboard area 24 are put into display, as shown in FIG. 5. If the mode selector switch 30 is depressed with the power ON/OFF switch 28 then depressed into the "ON" position, all the arithmetic key sections 36 and the particular row area of the function indicator key section 40 "GTO/MC/DRG" assigned to the basic calculation mode "MC" are put into display as shown in FIG. 6. Under this basic calculation mode, those row areas of the other key sections 40 of the function indication area 26 which are associated with the particular mode of function "MC" are also put into display and there is no indication in the display section 34 of the information display area 22.

Figure 7:
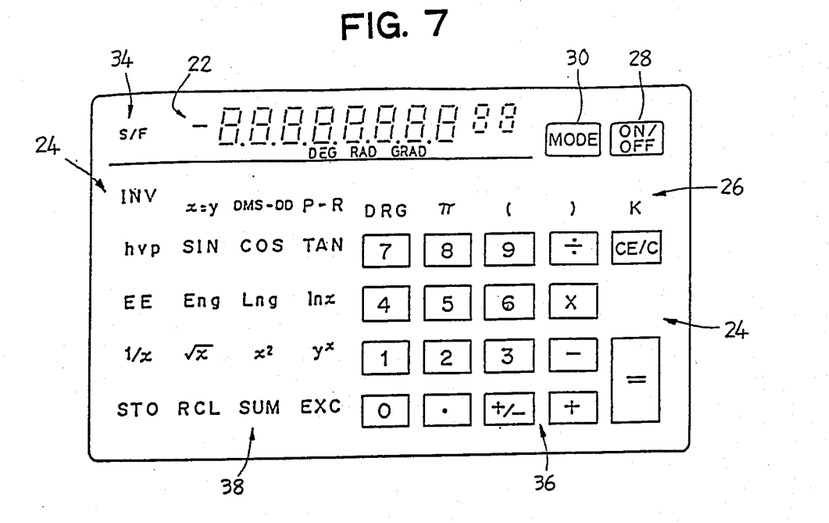
FIG. 7 shows the display of the panel produced with a scientific computation mode ("S/F") selected.

If the mode selector switch 30 is depressed for a second time after the calculator has been switched in, one of the row areas of each of all the instruction key sections 38 is put into display in addition to the arithmetic key sections 36 as shown in FIG. 7. In the function indication area 26, the row area of the key section 40 "GTO/MC/DRG" assigned to the function computation mode "DRG" as well as those row areas of the other key sections 40 of the function indication area 26 which are associated with the particular mode of function "DRG" are put into display. Under this scientific computation mode, there is the indication "S/F" in the display section 34 of the information display area and the operator is allowed to enter desired operating instructions by depressing any of the instruction key sections 38 such as, for example, the sine and cosine calculation key sections "SIN" and "COS" on display.

Figure 8:
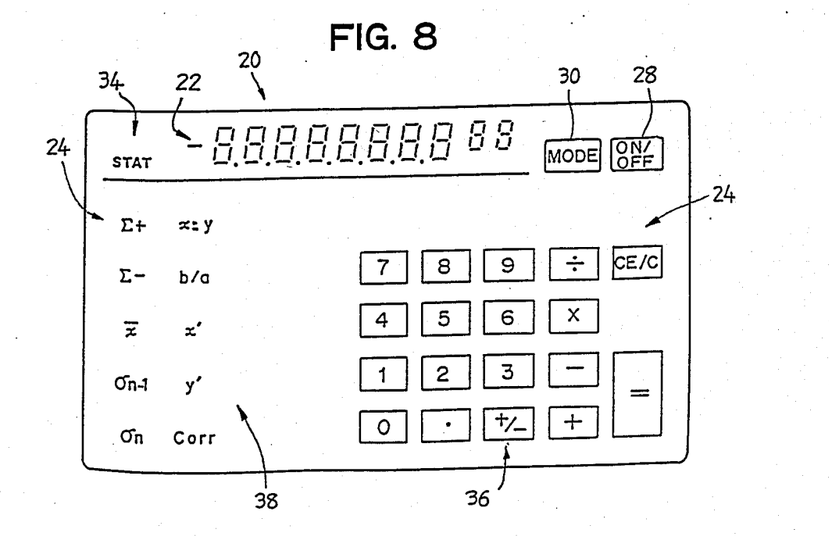
FIG. 8 shows the display of the panel produced with a statistic computation mode ("STAT") selected.

When the mode selector switch 30 is depressed for a third time, the other of the row areas of each of some instruction key sections 38 is put into display in addition to the arithmetic key sections 36 with the indication for the statistic computation mode "STAT" displayed in the display section 34 of the information display area 22 as shown in FIG. 8. Under this statistic computation mode "STAT", none of the key sections 44 of the function indication area 26 are put into display and the operator is allowed to enter desired operating instructions by depressing any of the instruction key sections 38 such as, for example, the arithmetic mean value calculation key section "$\bar{x}$" on display.

Figure 9:
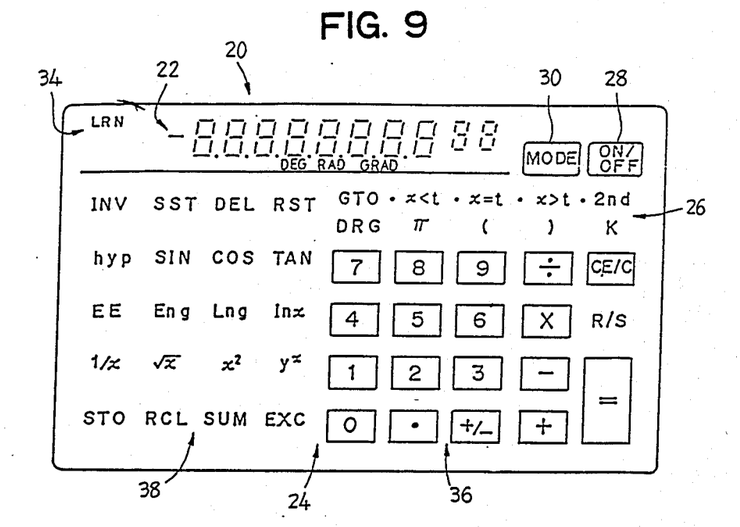
FIG. 9 shows the display of the panel produced with a program learning mode ("LRN") selected.

With the mode selector switch 30 depressed thereafter, one of the row areas of each of all the instruction key sections 38 is put into display in addition to the arithmetic key sections 36 as shown in FIG. 9. In the function indication area 26, the two row areas of the key section 40 "GTO/MC/DRG" assigned to the program learning mode "GTO" and function computation mode "DRG" as well as those row areas of the other key sections 40 of the function indication area 26 which are associated with the particular modes of function "DRG" and "GTO" are put into display. Under this mode of function, there is the indication "LRN" in the display section 34 of the information display area and the operator is also allowed to enter desired operating instructions by depressing any of the instruction key sections 38 on display.

Figure 10:
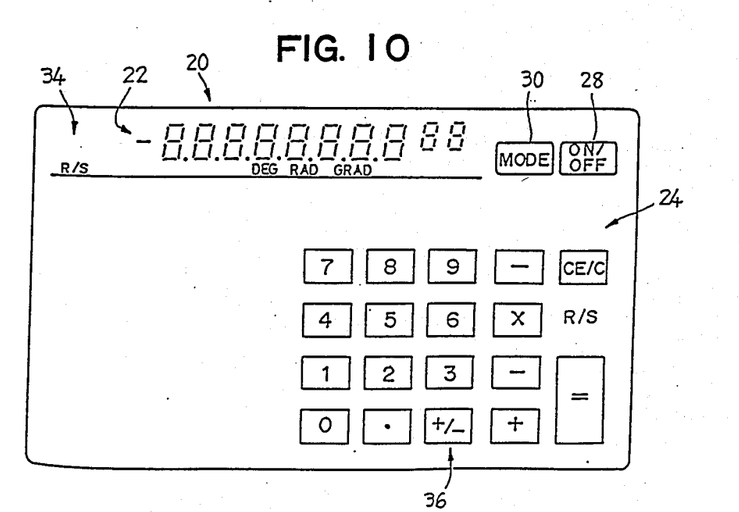
FIG. 10 shows the display of the panel produced with a programmable run/stop mode ("R/S"Z) selected.

When the mode selector switch 30 is depressed for a fifth time after the power "ON/OFF" switch 28 has been turned on, only the arithmetic key sections 36 are put into display with the indication for the programmable run/stop mode "R/S" displayed in the display section 34 of the information display area 22 as shown in FIG. 10.

Figure 11:
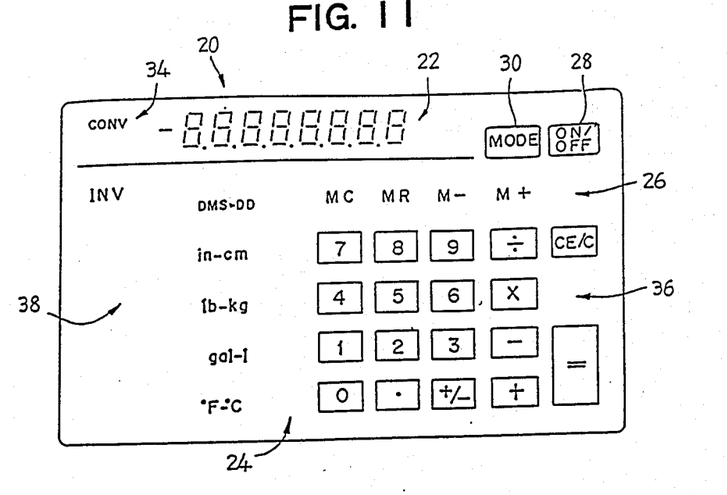
FIG. 11 shows the display of the panel produced with a unit conversion mode ("CONV") selected.

When the mode selector switch 30 is further depressed, one of the row areas of each of some instruction key sections 38 is put into display in addition to the arithmetic key sections 36 with the indication for the unit conversion mode "CONV" displayed in the display section 34 of the information display area 22 as shown in FIG. 11. Under this unit conversion mode "CONV", the row area of the function indicator key section 40 "GTO/MC/DRG" assigned to the basic calculation mode "MC" is put into display. Also put into display are those row areas of the other key sections 40 of the function indication area 26 which are associated with the particular mode of function "MC". The operator is now allowed to enter desired operating instructions by depressing any of the instruction key sections 38 such as, for example, the inch-centimeter conversion key section "in-cm" or the pound-kilogram conversion key section "ln-kg" on display.

Figure 12:
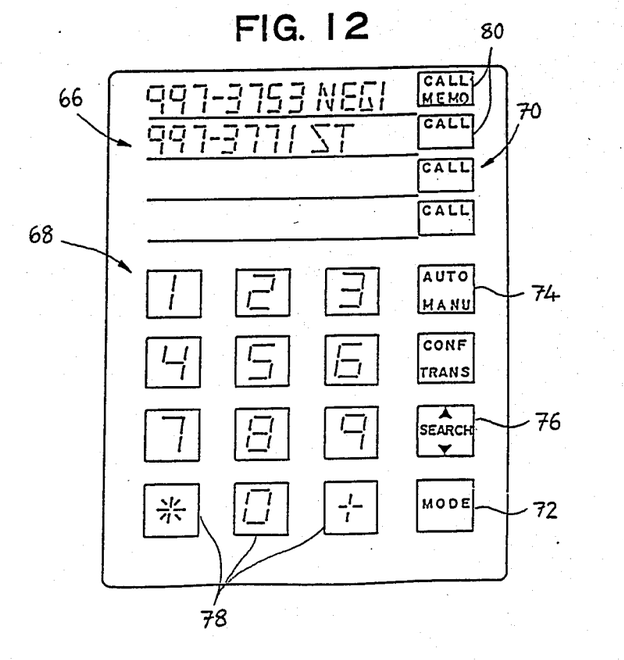
FIG. 12 is a plan view showing a second preferred embodiment of a display and keyboard panel according to the present invention, the display and keyboard panel being of a multifunction telephone set with the shown indicia selectively put into display.
Figure 13:
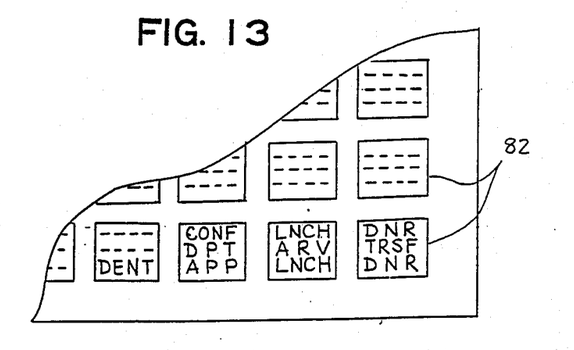
FIG. 13 is a fragmentary view which shows part of a third preferred embodiment of a display and keyboard panel according to the present invention, the third embodiment being applied to a scheduler for the recordal and display of various items of schedule.
Figure 14:
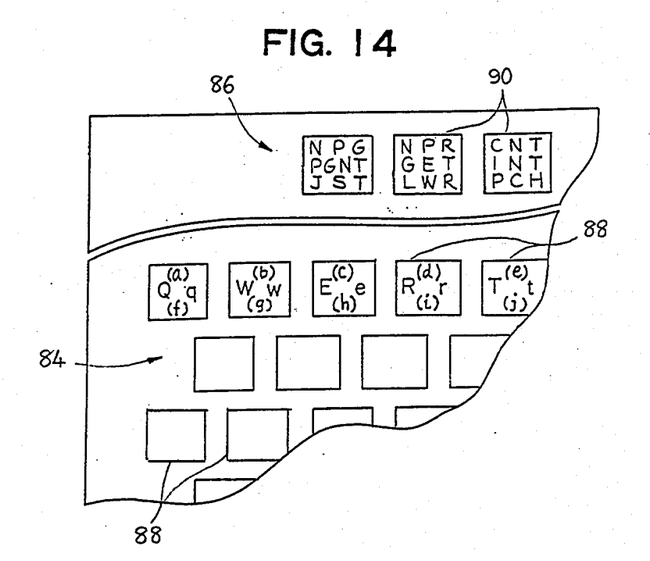
FIG. 14 is a fragmentary view which shows part of a fourth preferred embodiment of a display and keyboard panel according to the present invention, the fourth embodiment being applicable to the keyboard of a personal computer or a word processor.

While the display and keyboard panel embodying the present invention as has hereinbefore described is used on a handheld or desktop type electronic calculator a display and keyboard panel according to the present invention will find practical applications in various electronic devices requiring display and key-in capabilities. FIGS. 12, 13 and 14 of the drawings show preferred embodiments of a display and keyboard panel according to the present invention as applied to such electronic devices other than a calculator.

In FIG. 12 is shown an embodiment of a display and keyboard panel according to the present invention as applied to a multi-function telephone set. The display and keyboard panel herein shown largely comprises an information display area 66, a keyboard area 68 and a function indication area 70 in addition to a mode selector switch 72 ("MODE"), an automatic/manual dialing mode selector switch 74 ("AUTO/MANU"), and a two-way search instruction switch 76 ("SEARCH"). The information display area 66 forms a telephone directory and has a suitable number of row areas to be used for the successive or scrolled display of a number of telephone numbers each of which may be accompanied by any appropriate memorandum such as the full or abbreviated name of the subscriber. Each row area of such an information display area 66 typically consists of a plurality of numeral display sections each including a generally 8-shaped seven-segment numerical pattern formed by segment electrodes of a liquid crystal structure (not shown) which forms part of the display and keyboard panel of the telephone set. The keyboard area 68 of the display and keyboard panel consists of a number of numerical and sign key sections 78 which are arranged together with the switches 72, 74 and 76 in rows and columns below the information display area 66.

On the other hand, the function indication area 70 comprises a plurality of key sections 80 which are shown arranged in a single column on one side of the information display area 66 by way of example and which are located respectively in association with the individual row areas of the information display area 66 as shown. In the embodiment of a display and keyboard panel according to the present invention as herein shown, each of these key sections 80 of the function indication area 70 has two row areas assigned to different functions which can be performed by the telephone set, viz., a call mode "CALL" and a memory mode "MEMO", respectively, as shown. These two modes of function are to be alternately displayed in each of the function indicator key sections 80 as the mode selector switch 72 is depressed repeatedly. Though not shown in the drawings, the key sections 78 of the keyboard area 68 and the key sections 80 of the function indication area 70 are respectively formed by touch sensor switch areas provided in the liquid crystal structure in the telephone set similarly to the touch sensor switch areas 42 and 44 in the described first embodiment of a display and keyboard panel according to the present invention. Furthermore, the mode selector switch 72 "MODE", automatic/manual dialing mode selector switch 74 "AUTO/MANU", and two-way search instruction switch 76 "SEARCH" may also be formed by such touch sensor switch areas similarly to these key sections 78 and 80. If desired, a set of suitable instruction key sections similar to the instruction key sections 38 in the described first embodiment may be provided between the information display area 66 and keyboard area 68.

When, now, the mode selector switch 72 is depressed by the operator who desires to call one of the subscribers memorized in the telephone set, the indication for the call mode may be displayed in one of the two row areas of each of the function indicator key sections 80 of the function indication area 70 as indicated by the indicia "CALL" in solid lines. If the operator then depresses the automatic/manual dialing mode selector switch 74 to select the automatic dialing mode with the search instruction switch 76 depressed subsequently, the display on the information display area 66 scrolls either upward or downward so that the telephone numbers registered in the telephone set appear successively in the individual row areas of the information display area 66. At a point of time the desired telephone number is displayed in any one of the row areas of the information display area 66, the operator will depress the key section 80 located in association with the particular row area of the information display area 66. The selected subscriber's telephone number is now automatically dialed to make connection to the desired subscriber line. If the manual dialing mode has been selected at the selector switch 74, the operator will manually dial the particular subscriber's number at the key sections 78 of the keyboard area 68. If the memory mode has been selected with the mode selector switch 72 depressed repeatedly, the indication for such a mode of operation is displayed in the other row area of each of the function indicator key sections 80 of the function indication area 70 as indicated by the indicia "MEMO" in dotted lines.

FIG. 13 shows part of a third preferred embodiment of a display and keyboard panel according to the present invention. The third preferred embodiment of the present invention is applied to a scheduler for the recordal and display of various items of schedule and is characterized by a number of schedule indicator key sections 82 in addition to a mode selector switch (not shown). These schedule indicator key sections 82 are shown arranged in rows and columns by way of example and each of the key sections 82 has three row areas which may be used for the indication of various business and private items of schedule. These items of schedule may include, for example, an appointed time for a luncheon party ("LNCH"), an appointed time for a dinner party ("DNR"), a scheduled time of transfer on a traffic line ("TRSF"), a scheduled time of arrival ("ARV"), a scheduled time of departure ("DPT"), a scheduled time for a meeting or conference ("CONF"), a preset time for a business appointment ("APP"), an appointment with a dentist ("DENT") and so on, as shown. Though not shown in the drawings, the schedule indicator key sections 82 bearing these indications are respectively formed by touch sensor switch areas provided in a liquid crystal structure of the display and keyboard panel provided on the scheduler similarly to the touch sensor switch areas 42 and 44 in the described first embodiment of a display and keyboard panel according to the present invention. While the various items of schedule are herein shown indicated by alphabetic letters, indications using symbols or by pictographs may be used alternatively.

FIG. 14 shows part of a fourth preferred embodiment of a display and keyboard panel according to the present invention. The embodiment herein shown is applicable to a personal computer or a word processor using a cathode-ray tube as a display module and comprises a keyboard area 84 and a function indication area 86 in addition to a mode selector switch (not shown). The keyboard area 84 consists of a number of alphanumerical and sign key sections 88 which are arranged in rows and offset columns below the function indication area 86. The keyboard using the display and keyboard panel herein shown is assumed to be of the four-shift design so that each of the key sections 88 has assigned thereto a total of four letters or signs. These four letters or signs typically consist of an alphabetic capital letter, an alphabetic small letter and two letters or signs which are shown represented by alphabetic small letters each enclosed within parentheses.

On the other hand, the function indication area 86 comprises a plurality of key sections 90 which are shown arranged in a single row above the keyboard area 84 by way of example. Each of these key sections 90 of the function indication area 86 has three row areas assigned to different modes of function which can be performed by the personal computer or word processor. These functions may include a centering mode ("CNT"), an interlineation mode ("INT"), a pitch change mode ("PCH"), a paragraph change mode ("NPR"), a copy or get mode ("GET"), a letter lower mode ("LWR"), a page change mode ("NPG"), a pagination mode ("PGNT"), a justification mode ("JST") and so on, as shown. These three modes of function assigned to each of the key sections 90 are to be selectively displayed as the mode selector switch is depressed repeatedly. Though not shown in the drawings, the key sections 88 of the keyboard area 84 and the key sections 90 of the function indication area 86 are respectively formed by touch sensor switch areas provided in the liquid crystal structure which forms part of the display and keyboard panel similarly to the touch sensor switch areas 42 and 44 in the described first embodiment of a display and keyboard panel according to the present invention.

As will have been understood from the foregoing description, a display and keyboard panel according to the present invention is applicable to any of various electronic devices and systems such as, for example, a calculator, telephone set, scheduler, personal computer and word processor. Such a display and keyboard panel is characterized, inter alia, in that the keyboard and function indicator areas of the panel are arranged to permit the operator of the electronic device or system to enter information at the key sections of the keyboard area while viewing or glancing at the indications appearing in the key sections of the function indication area which is located in the vicinity of the function indication area. The display and keyboard panel according to the present invention thus provides ease of use and a minimum chance of error in keying information, offering an efficient man-machine interface between the operator and the calculator.

A display and keyboard panel according to the present invention is further characterized in that each of the individual key sections of the function indication area consists of a plurality of adjacent component areas respectively assigned to different pieces of information such as different modes of function or different items of business and private schedule. A significantly increased amount of information can therefore be display on the display and keyboard panel or, in another aspect, a significantly reduced total area suffices for the provision of the function indication area on the panel. In the liquid crystal structure used as the display medium, furthermore, all the segment electrodes in each of the component areas of each touch sensor switch area are connected to the power source through a single, common conductive line so that the drive system for the function indication area can be significantly simple in construction as compared to a drive system for a liquid crystal structure using the matrix-array display electrode arrangement and can be realized by a large-scale integrated circuit of a relatively small capacity.

While it has been assumed that each of the key sections of the function indication area consists of two or more adjacent component areas, four or even more component areas may be provided in each of the key sections of the function indication area of a display and keyboard panel according to the present invention.

What is claimed is:

1. An electronic device having a display and keyboard panel comprising:
    said electronic device having said display area and said keyboard area;
    said keyboard area having said plurality of switches, each of said first plurality of switches providing a constant input to said electronic device and providing a visual indication at each of said first plurality of switches of the function thereof represented by said constant input,
    said display area being responsive to said first plurality of switches to provide an indication thereon responsive to the switch being actuated; and
    an indication area located adjacent said keyboard area having a second plurality of switches uniquely responsive to each of plural mode settings of said electronic device to provide different variable inputs to said electronic device for each of said plural mode settings and to provide at each of said second plurality of switches a visual display of the current function thereof represented by said variable input.

2. The electronic device as set forth in claim 1, wherein each of the second plurality of switches comprises a touch sensor switch.

3. The electronic device as set forth in claim 2, wherein each of said touch sensor switches includes a liquid crystal display.

4. The electronic device as set forth in claim 1, wherein the display area comprises a liquid crystal display, and wherein each of the first and second plurality of switches comprises a liquid crystal display structure.

5. The electronic device as set forth in claim 4, wherein the first plurality of switches defines arithmetic and instruction key sections, and the second plurality of switches defines function indicator switches.

6. The electronic device as set forth in claim 5, wherein each of the first and second plurality of switches comprises a touch sensor switch.

7. The electronic device as set forth in claim 1 further including switch means to provide said mode settings.

* * * * *